(12) United States Patent
Beaurepaire et al.

(10) Patent No.: US 12,097,881 B2
(45) Date of Patent: Sep. 24, 2024

(54) METHOD, APPARATUS, AND SYSTEM FOR DETERMINING AN AUTONOMOUS VEHICLE OPERATIONAL STRATEGY WHEN DETECTING WRONG WAY DRIVING

(71) Applicant: HERE Global B.V., Eindhoven (NL)

(72) Inventors: Jerome Beaurepaire, Berlin (DE); Amarnath Nayak, Mumbai (IN)

(73) Assignee: HERE GLOBAL B.V., Eindhoven (NL)

(*) Notice: Subject to any disclaimer, the term of this patent is extended or adjusted under 35 U.S.C. 154(b) by 371 days.

(21) Appl. No.: 17/546,763

(22) Filed: Dec. 9, 2021

(65) Prior Publication Data
US 2023/0182775 A1 Jun. 15, 2023

(51) Int. Cl.
*B60W 30/09* (2012.01)
*B60Q 5/00* (2006.01)
(Continued)

(52) U.S. Cl.
CPC ........ *B60W 60/0016* (2020.02); *B60W 30/09* (2013.01); *B60W 30/18036* (2013.01);
(Continued)

(58) Field of Classification Search
CPC ............ B60W 60/0016; B60W 30/09; B60W 30/18036; B60W 30/18163; B60W 50/14; B60W 2530/201; B60W 2540/049; B60W 2540/215; B60W 2552/10; B60W 2554/4042; B60W 2554/4044; B60W 2554/801; B60W 2554/802; B60W 2556/65; B60W 2720/10; B60Q 1/46; B60Q 5/006; B60Q 5/005; B60Q 2800/10
See application file for complete search history.

(56) References Cited

U.S. PATENT DOCUMENTS 10,351,131 B2 7/2019 Al-Deek et al.
2009/0192683 A1* 7/2009 Kondou ................ B60W 10/18
701/53
(Continued)

FOREIGN PATENT DOCUMENTS

WO 2019092159 A1 5/2019

OTHER PUBLICATIONS

Evans et al., "Ethical Decision Making in Autonomous Vehicles: The AV Ethics Project", Science and Engineering Ethics, vol. 26, Oct. 13, 2020, pp. 3285-3312.
(Continued)

*Primary Examiner* — Ashley L Redhead, Jr.

(57) ABSTRACT

An approach is provided for determining an autonomous vehicle reaction strategy when facing a wrong way driving vehicle. The approach, for example, involves processing mapping data, sensor data, or a combination thereof to develop a map of an area within a threshold distance of an autonomous vehicle in response to a detection of an oncoming vehicle that is driving in a wrong direction towards the autonomous vehicle. The approach also involves using a decision tree of a plurality of candidate strategies for avoiding the oncoming vehicle to select a strategy based on one or more attributes of the map. The approach further involves presenting the selected strategy in a user interface of the autonomous vehicle.

6 Claims, 16 Drawing Sheets

(51) Int. Cl.
    *B60W 30/18*         (2012.01)
    *B60W 50/14*         (2020.01)
    *B60W 60/00*         (2020.01)
    *B60Q 1/46*          (2006.01)

(52) U.S. Cl.
    CPC ...... *B60W 30/18163* (2013.01); *B60W 50/14* (2013.01); *B60Q 1/46* (2013.01); *B60Q 5/006* (2013.01); *B60W 2530/201* (2020.02); *B60W 2540/049* (2020.02); *B60W 2540/215* (2020.02); *B60W 2552/10* (2020.02); *B60W 2554/4042* (2020.02); *B60W 2554/4044* (2020.02); *B60W 2554/801* (2020.02); *B60W 2554/802* (2020.02); *B60W 2556/65* (2020.02); *B60W 2720/10* (2013.01)

(56) References Cited

U.S. PATENT DOCUMENTS

| | | |
|---|---|---|
| 2014/0350837 A1 | 11/2014 | Galbas et al. |
| 2019/0329780 A1 | 10/2019 | Tomescu |
| 2019/0378407 A1 | 12/2019 | Correia |
| 2019/0389460 A1* | 12/2019 | Tokunaga .............. B60K 35/00 |
| 2024/0038067 A1* | 2/2024 | Floerchinger .... G08G 1/096725 |

OTHER PUBLICATIONS

Szymkowski, "Amazon-owned self-driving car startup Zoox shows off its pod vehicle", Dec. 14, 2020, https://www.cnet.com/roadshow/news/amazon-self-driving-car-startup-zoox-pod-vehicle/, 4 pages.

* cited by examiner

METHOD, APPARATUS, AND SYSTEM FOR DETERMINING AN AUTONOMOUS VEHICLE OPERATIONAL STRATEGY WHEN DETECTING WRONG WAY DRIVING

BACKGROUND

Providing environmental awareness for vehicle safety, particularly in autonomous driving, has been a primary concern for automobile manufacturers and related service providers. For example, as autonomous vehicles become more common, they are also more likely to encounter dangerous situations such as facing vehicles that drive the wrong way against the direction of traffic. Accordingly, service providers face significant technical challenges to enabling autonomous to operate as safely as possible in a wrong way driving situation.

SOME EXAMPLE EMBODIMENTS

Therefore, there is a need for determining a strategy for how an autonomous vehicle operates when detecting facing a vehicle driving the wrong way.

According to one embodiment, a method comprises processing mapping data, sensor data, or a combination thereof to develop a map of an area within a threshold distance of an autonomous vehicle in response to a detection of an oncoming vehicle that is driving in a wrong direction towards the autonomous vehicle. The method also comprises using a decision tree of a plurality of candidate strategies for avoiding the oncoming vehicle to select a strategy based on one or more attributes of the map. The method further comprises presenting the selected strategy in a user interface of the autonomous vehicle, and optionally configuring the autonomous vehicle to operate using the selected strategy.

According to another embodiment, an apparatus comprises at least one processor, and at least one memory including computer program code for one or more computer programs, the at least one memory and the computer program code configured to, with the at least one processor, cause, at least in part, the apparatus to process mapping data, sensor data, or a combination thereof to develop a map of an area within a threshold distance of an autonomous vehicle in response to a detection of an oncoming vehicle that is driving in a wrong direction towards the autonomous vehicle. The apparatus is also caused to use a decision tree of a plurality of candidate strategies for avoiding the oncoming vehicle to select a strategy based on one or more attributes of the map. The method is further caused to present the selected strategy in a user interface of the autonomous vehicle, and optionally configuring the autonomous vehicle to operate using the selected strategy.

According to another embodiment, a non-transitory computer-readable storage medium carries one or more sequences of one or more instructions which, when executed by one or more processors, cause, at least in part, an apparatus to process mapping data, sensor data, or a combination thereof to develop a map of an area within a threshold distance of an autonomous vehicle in response to a detection of an oncoming vehicle that is driving in a wrong direction towards the autonomous vehicle. The apparatus is also caused to use a decision tree of a plurality of candidate strategies for avoiding the oncoming vehicle to select a strategy based on one or more attributes of the map. The method is further caused to present the selected strategy in a user interface of the autonomous vehicle, and optionally configuring the autonomous vehicle to operate using the selected strategy.

In addition for various example embodiments described herein, the following is applicable: a computer program product may be provided. For example, a computer program product comprising instructions which, when the program is executed by a computer, cause the computer to perform any one or any combination of methods (or processes) disclosed.

According to another embodiment, an apparatus comprises means for processing mapping data, sensor data, or a combination thereof to develop a map of an area within a threshold distance of an autonomous vehicle in response to a detection of an oncoming vehicle that is driving in a wrong direction towards the autonomous vehicle. The apparatus also comprises means for using a decision tree of a plurality of candidate strategies for avoiding the oncoming vehicle to select a strategy based on one or more attributes of the map. The apparatus further comprises means for presenting the selected strategy in a user interface of the autonomous vehicle, and optionally configuring the autonomous vehicle to operate using the selected strategy.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining an autonomous vehicle operational strategy when detecting wrong way driving (WWD) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
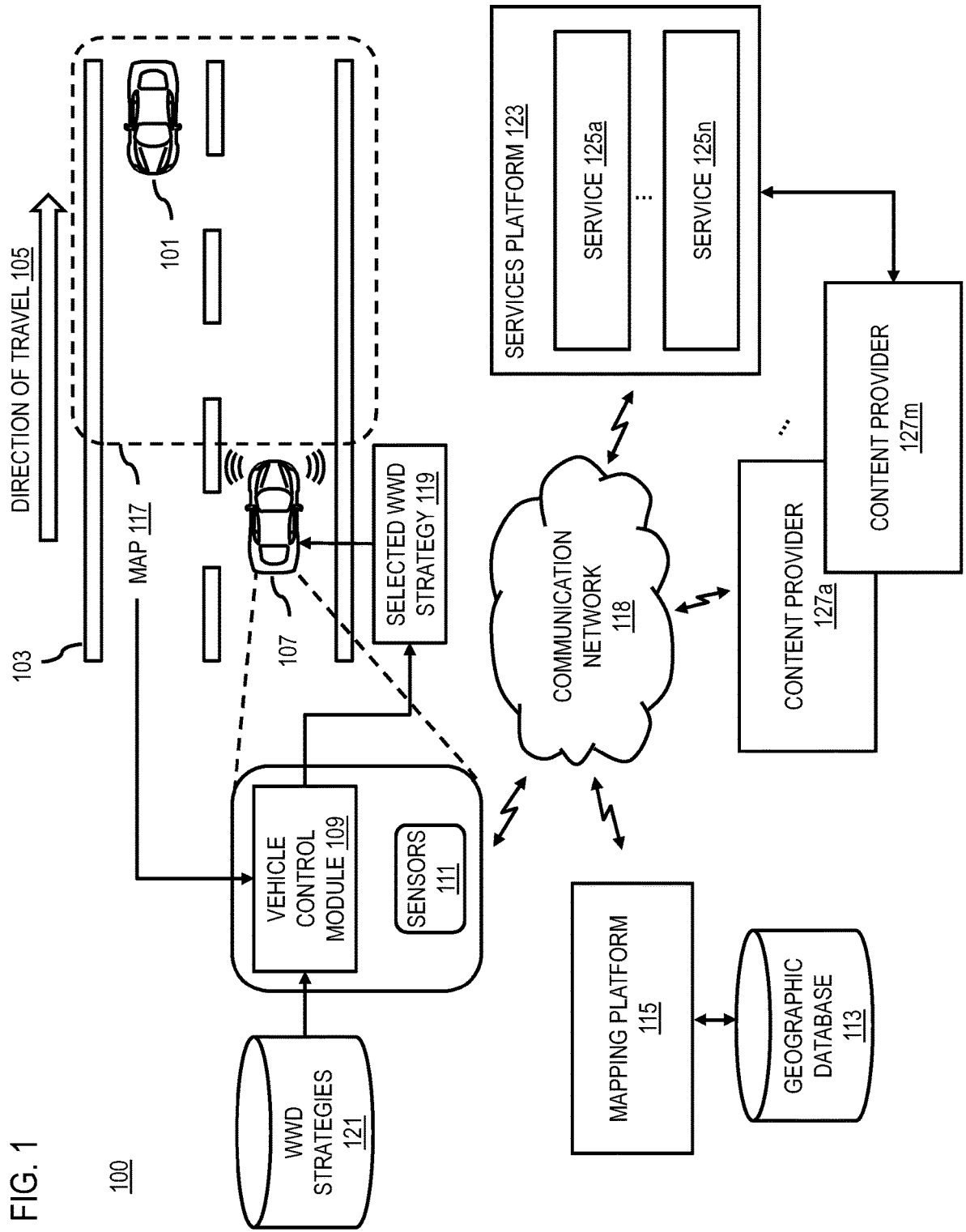
FIG. 1 is a diagram of a system capable of determining an autonomous vehicle operational strategy when detecting wrong way driving (WWD), according to one embodiment.
Figure 2:
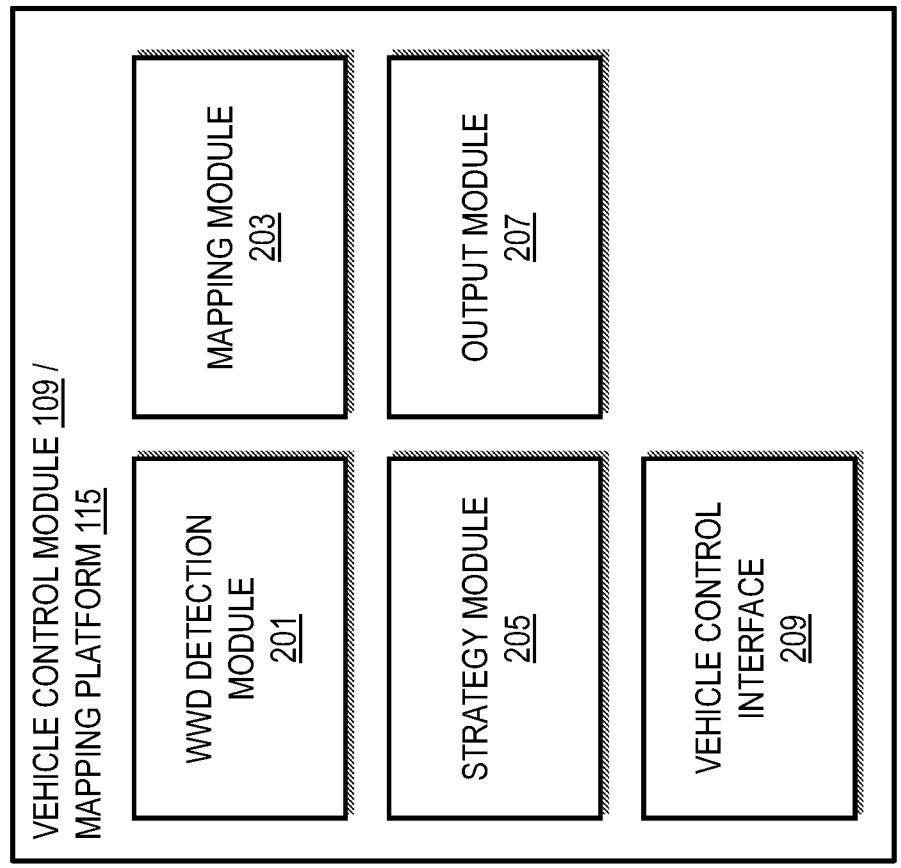
FIG. 2 is a diagram of the components of a vehicle control module and/or mapping platform, according to one embodiment.

FIG. 1 is a diagram of a system capable of determining an autonomous vehicle operational strategy when detecting wrong way driving (WWD), according to one embodiment. As used herein, WWD occurs when an oncoming vehicle 101 is driving on a unidirectional road 103 (e.g., a road that supports only one direction of travel at a given time) in the wrong or opposite way as the direction of travel 105 of the unidirectional road 103. With respect to an autonomous vehicle (e.g., autonomous vehicle 107), WWD can be particularly dangerous because WWD scenarios are relatively rare occurrences in a real-world environment but can potentially cause a catastrophic collision with the autonomous vehicle. Moreover, because of the rarity of WWD events and because autonomous vehicles 107 operate with no or reduced human driver input, there are fewer instances of such events that can be used to train the autonomous vehicles 107 to safely react when facing an oncoming vehicle 101 driving in the wrong direction. In other words, because the occurrence of WWD events on given road segments can be fleeting because their movements are dynamic and unpredictable, ensuring that autonomous vehicles 107 can react to WWD as safely as possible in real time is technically challenging.

To address these challenges, a system 100 of FIG. 1 introduces a capability to enable an autonomous vehicle 107 and/or its passengers to avoid accidents resulting from WWD events by applying a relevant WWD reaction strategy when detecting that another vehicle (e.g., oncoming vehicle 101) is driving the wrong way towards the autonomous vehicle 107. In one embodiment, a dedicated user interface is provided for surfacing the strategy to avoid the wrong way driving. To determine the relevant reaction strategy, the system 100 (e.g., via a vehicle control module 109) can use real-time sensor data collected from one or more sensors 111 (e.g., associated the autonomous vehicle 107, other vehicles (not shown), road network infrastructure (not shown), and/or any other component of the system 100)) alone or in combination of map data (e.g., provided from a geographic database 113 by a mapping platform 115 over a communication network 118) to construct a dynamic map 117 of the environment within a threshold proximity of the WWD event.

The system 100 then uses a decision tree (or other equivalent decision making or classification algorithm such as but not limited to a machine learning algorithm) to determine a selected WWD reaction strategy 117. The decision tree uses one or more attributes of the dynamic map 117 (e.g., presence or absence of features, objects, vehicles, etc.) to determine a selected WWD reaction strategy 119 (e.g., the relevant reaction strategy) from among a set of available or candidate WWD reaction strategies 121. As used herein, a WWD reaction strategy comprises one or more actions that can be taken by the autonomous vehicle 107 and/or other vehicles/component/devices/etc. to minimize the safety risks associated with the WWD event.

In one embodiment, the system 100 can further include a services platform 123, one or more services 125a-125n (also collectively referred as services 125) of the services platform 123, and/or one or more content providers 127a-127m (also collectively referred to as content providers 127) that can use the output selected WWD reaction strategy 119 to provide user interfaces for surfacing the selected WWD reaction strategy 119 and/or any of the available/candidate WWD reaction strategies 121. In addition or alternatively, the services platform 123, services 125, and/or content providers 127 can provide data for generating the dynamic map 117 or data related to presenting and/or implementing the selected WWD reaction strategy 119.

Figure 3:
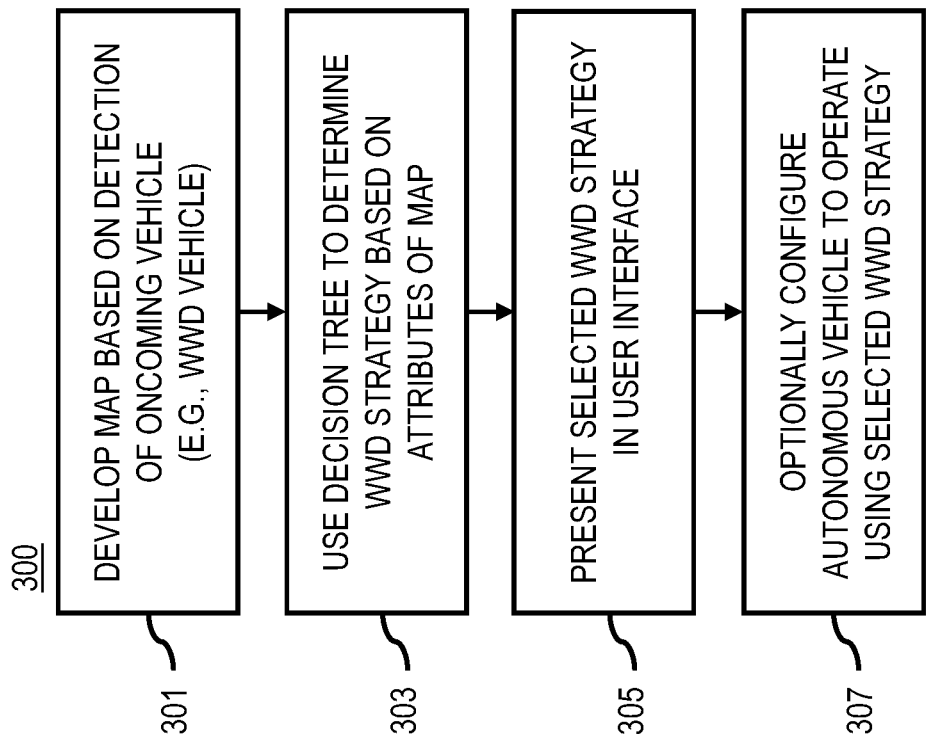
FIG. 3 is a flowchart of a process for determining an autonomous vehicle operational strategy when detecting WWD, according to one embodiment.

In one embodiment, the vehicle control module 109 (e.g., a local component) alone or in combination with the mapping platform 115 (e.g., a cloud or server-side component) performs the functions associated with determining WWD reaction strategies for an autonomous vehicle according to the embodiments described herein. FIG. 3 is a diagram of the vehicle control module 109 and/or mapping platform 115 with respect to performing these functions, according to one embodiment. By way of example, the vehicle control module 109 and/or mapping platform 115 include one or more components for determining WWD reaction strategies according to the various embodiments described herein. It is contemplated that the functions of these components may be combined or performed by other components of equivalent functionality. As shown, in this embodiment, the vehicle control module 109 and/or mapping platform 115 include a WWD detection module 201, a mapping module 203, a strategy module 205, output module 207, and a vehicle control interface 209. The above presented modules and components of the vehicle control module 109 and/or mapping platform 115 can be implemented in hardware, firmware, software, or a combination thereof. Though depicted as separate entities in FIG. 1, it is contemplated that the vehicle control module 109 and/or mapping platform 115 may be implemented as a module of any of the components of the system 100 (e.g., a component of the autonomous vehicle 107, services platform 123, services 125*a*-119*n* (also collectively referred to as services 125), etc.). In another embodiment, one or more of the modules 201-209 may be implemented as a cloud-based service, local service, native application, or combination thereof. The functions of the vehicle control module 109, mapping platform 115, and modules 201-209 are discussed with respect to the figures below.

Figure 10:
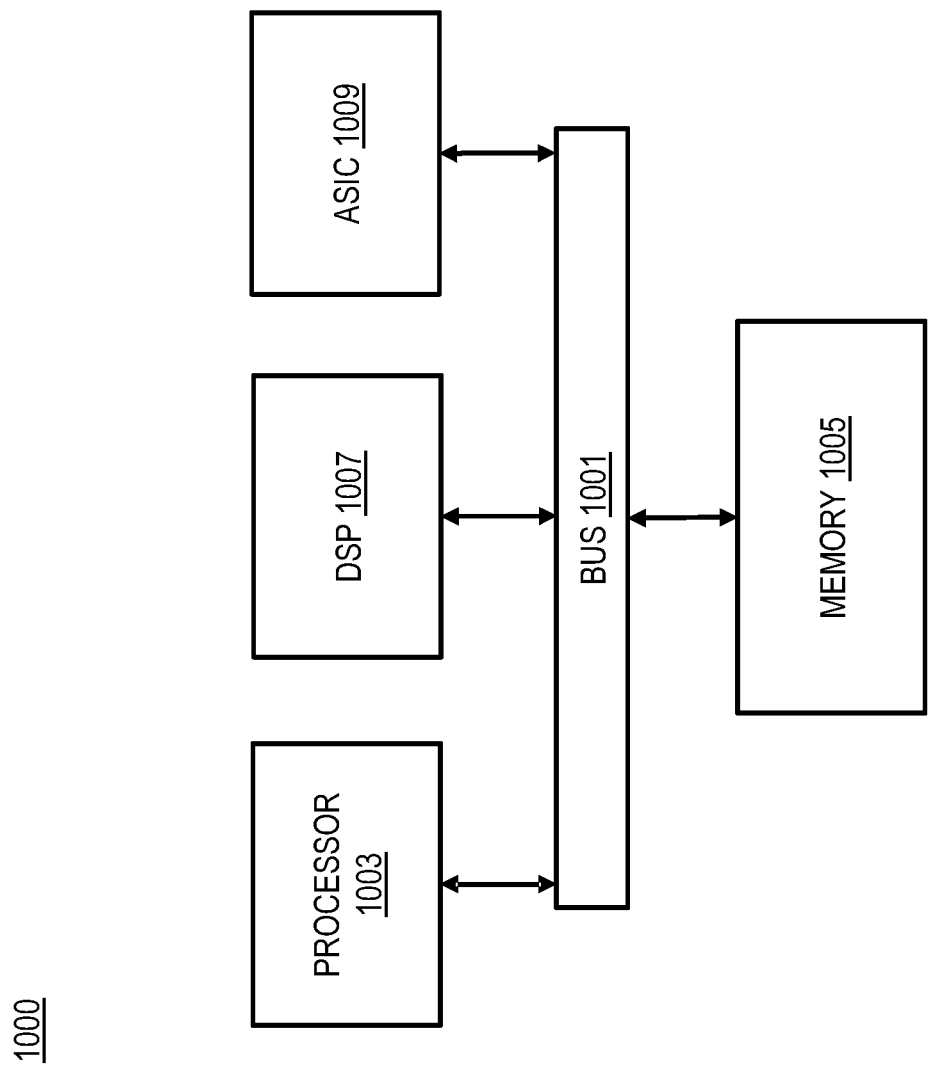
FIG. 10 is a diagram of a chip set that can be used to implement an embodiment.

FIG. 3 is a flowchart of a process for determining an autonomous vehicle operational strategy when detecting WWD, according to one embodiment. In various embodiments, the vehicle control module 109 and/or mapping platform 115, and/or any of the modules 201-209 may perform one or more portions of the process 300 and may be implemented in, for instance, a chip set including a processor and a memory as shown in FIG. 10. As such, the vehicle control module 109 and/or mapping platform 115, and/or any of the modules 201-209 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the process 300 is initiated when a detection of the oncoming vehicle 101 in the wrong direction towards the autonomous vehicle 107 (e.g., a WWD event) occurs. It is contemplated that the WWD detection module 201 can use any process or method to detect the oncoming vehicle 101 as a WWD event. These processes or methods include but are not limited to: (1) direct detection using onboard sensors such as but not limited to cameras, LiDAR sensors, radar, etc.; and (2) indirect detection based on reports from other vehicles (e.g., via vehicle-to-vehicle (v2v), vehicle-to-everything (v2x), or equivalent), infrastructure components, services platform 123, services 125, content providers 127, and/or the like. In one embodiment, the WWD detection module 100 can calculate a risk score based, for instance, a likelihood of a collision with the detected oncoming vehicle 101. The risk score can be based on factors such as but not limited to a predicted path, speed, size, mass, etc. of the oncoming vehicle 101. If the risk score is above a threshold value (e.g., 100% or above a predefined threshold), then a WWD event can be detected.

In step 301, in response to a detection of an oncoming vehicle 101 that is driving in a wrong direction towards the autonomous vehicle 107 (e.g., a WWD event), the mapping module 203 processes mapping data (e.g., from the geographic database 113, sensor data (e.g., collected from one or more sensors 111 of the autonomous vehicle 107), or a combination thereof to develop a map 117 of an area within a threshold distance of the autonomous vehicle 107. In one embodiment, the map 117 may also include off-road areas that the autonomous vehicle 107 can drive one (e.g., off-road areas that are flat and have no hard obstacles that can damage the autonomous vehicle 107). The development of the map 117 can be performed dynamically based on real-time mapping and/or sensor data to determine one or more attributes that can be used for inputs for determining the selected WWD reaction strategy 119 for a given context. The one or more attributes can also be used to evaluate which of the candidate WWW reaction strategies 121 are available under a given context defined by the attributes. Examples of the one or more attributes of the map 117 indicate at least one or more of, but is not limited to, the following about the environment associated with the autonomous vehicle 107 and/or surrounding area:

- A first lane in which the autonomous vehicle 107 is driving;
- A second lane in which the oncoming vehicle 101 is approaching in the wrong direction;
- A number of lanes of a road on which the autonomous vehicle 107, the oncoming vehicle 101, or a combination thereof is driving;
- A road width of the road;
- A distance (e.g., relative distance) to one or more other vehicles (e.g., that are on the same road);
- A speed of the one or more other vehicles;
- A number and/or locations of one or more other autonomous vehicles (e.g., that are on the same road);
- Whether the one or more other autonomous vehicles are empty or are carrying at least one passenger; and
- An alternate route (e.g., escape route or safe route) for the autonomous vehicle 107.

As noted above, the map 117 and its attributes can be identified using mapping data and/or sensor data. With respect to mapping data, the mapping module 203 can query the geographic database for mapping data representing the geographic area surrounding the autonomous vehicle 107 (e.g., within the designated threshold proximity or distance). For example, the mapping data can include but is not limited to the road network topology (e.g., for determining escape routes), function class, speed limits, number of lanes, etc. With respect to sensor data, the mapping module 203 can use computer vision or other car sensor data (e.g., LiDAR, radar, accelerometer, compass, inertial measurement units (IMUs), etc.) to identify objects in the environment to determine real-time conditions in the surrounding environment (e.g., presence of other vehicles, objects, etc.) that are not available in the mapping data of the geographic database 113). In addition, the sensor data can help to more precisely localize the autonomous vehicle 107 relative to other vehicles and/or objects in the environment including but not limited to the oncoming vehicle 101, other vehicles, other autonomous vehicles, road signs, other cartographic features, etc.

Figure 4:
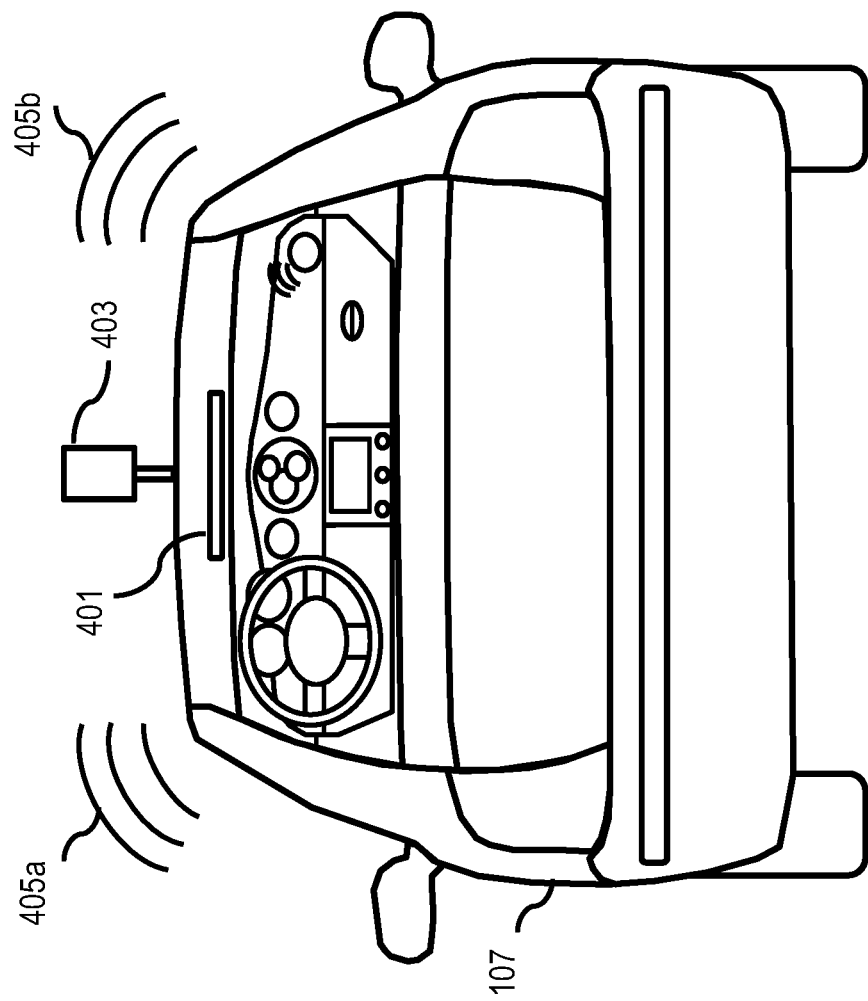
FIG. 4 is a diagram illustrating an example of mapping an environment for determining WWD reaction strategies, according to one embodiment.

FIG. 4 is a diagram illustrating an example of mapping an environment for determining WWD reaction strategies, according to one embodiment. As shown, the autonomous vehicle 107 can be equipped with sensors 111 such as but not limited to a camera sensor 401, a LiDAR sensor 403, and infrared sensors 405a and 405b (also collectively referred to as infrared sensors 405). the autonomous vehicle 107 can use these sensors on detection of a WWD event (e.g., detection of the oncoming vehicle 101 driving the wrong way towards the autonomous vehicle 107) and begin collecting sensor data to map a surrounding area according to the various embodiments described herein. In one embodiment, the autonomous vehicle 107 can also receive sensor data collected by other nearby vehicles and/or nearby infrastructure sensors (e.g., inground traffic loop sensors, traffic cameras, etc.) by v2v, v2x, or any other equivalent communication protocol (e.g., available over the communication network 118. The sensor data and corresponding map data from the geographic database 113 can be processed to identify the attributes described above and included in the dynamic map 117.

In step 303, the strategy module 205 uses a decision tree of a plurality of candidate strategies for avoiding the oncoming vehicle to select a strategy based on one or more attributes of the map. In other words, the strategy module 205 uses a specific decision tree to determine scenario(s) (e.g., WWD reaction strategies 121) to apply for reacting to a WWD threat based on context and available options (e.g., as determined from attributes of the map 117). By way of example, these WWD reaction strategies 121 or scenarios can include but is not limited to: (a) using reverse driving to flee a possible collision when informed early enough; (b) finding another autonomous vehicle without a passenger to collide with the WWD threat (e.g., the oncoming vehicle 101) as a last resort; (c) last second maneuver avoidance based on sensors detection; (d) the autonomous vehicle 107 attempting to do a deceptive maneuver to confuse an attacking autonomous vehicle (e.g., the oncoming vehicle 101) controlled by a hacker; (e) the autonomous vehicle 107 deciding to hit another road element or object known to be less damaging than hitting another front facing vehicle (e.g., the oncoming vehicle 101). It is noted that the above example WWD reaction strategies 121 are provided by way of illustration and not as limitations. It is contemplated that any other WWD reaction strategy can be included in the decision tree for evaluation and possible selection based on the context as determined from the map 117. The above and additional example strategies are discussed with respect to the example decision tree 500 of FIG. 5.

Figure 5:
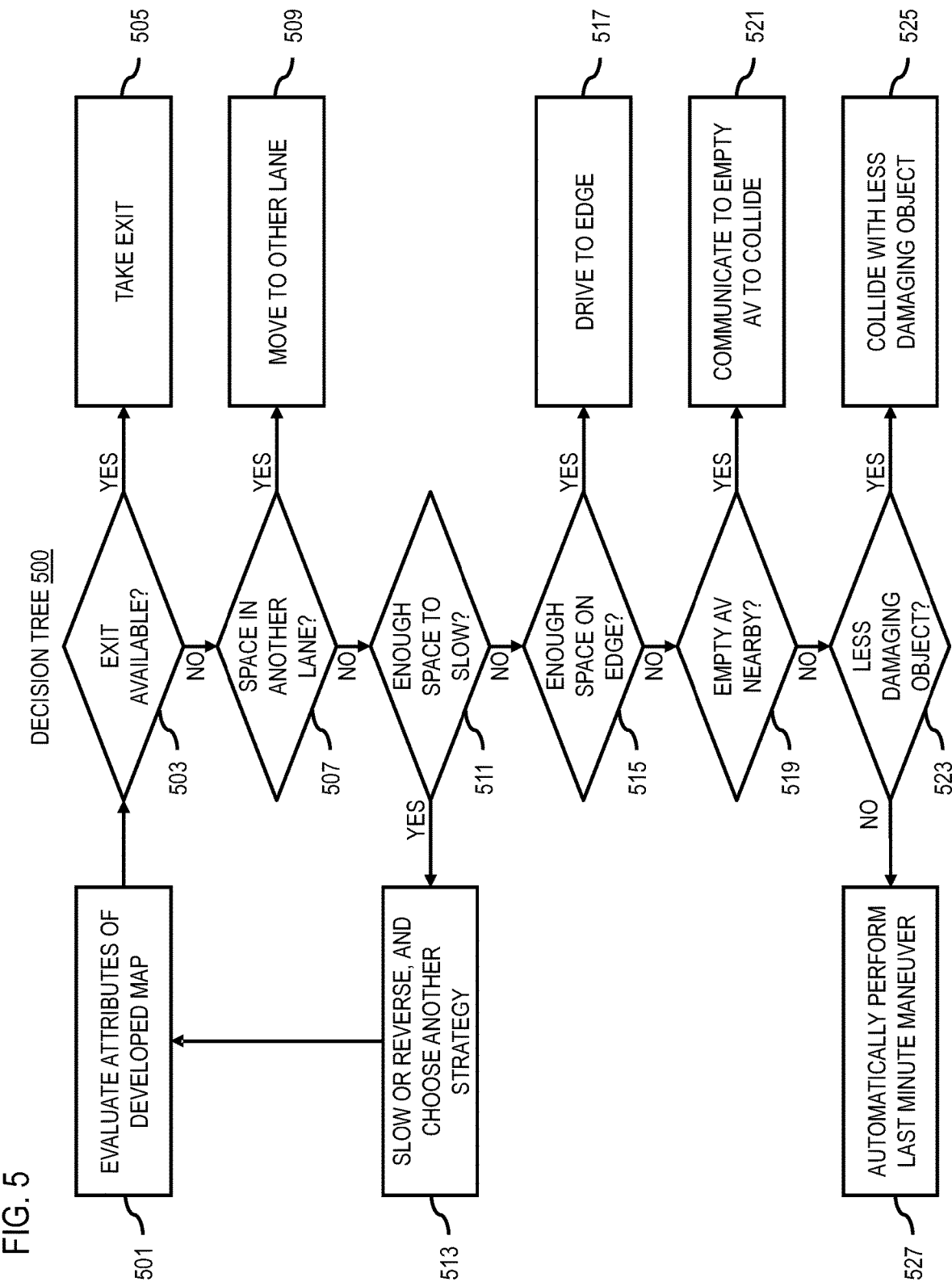
FIG. 5 is a diagram illustrating an example decision tree for selecting WWD reaction strategies based on a mapped environment, according to one embodiment.

FIG. 5 is a diagram illustrating an example decision tree 500 for selecting WWD reaction strategies based on a mapped environment, according to one embodiment. As shown, in step 501 of the decision tree 500, the strategy module 205 evaluates the attributes of the developed map 117 of the area surrounding the autonomous vehicle 107 that is the subject of the WWD threat. This evaluation, for instance, comprise matching the attributes as determined in the map 117 against decision criteria corresponding to each respective candidate WWD reaction strategy 221 included in the decision tree 500.

For example, beginning at decision step 503, the decision tree 500 determines whether the attributes of the map 117 indicates that an exit path is available to the autonomous vehicle 107 before. If there is an exit path, then the selected WWD reaction strategy 119 is to take the exit before the oncoming vehicle 101 collides with the autonomous vehicle (step 505). In other words, when time allows (e.g., if the autonomous vehicle 107 has been warned by v2v, v2x, etc. from another vehicle or device), the best strategy might be to simply exit the highway or road by taking the next exit.

Figure 6A:
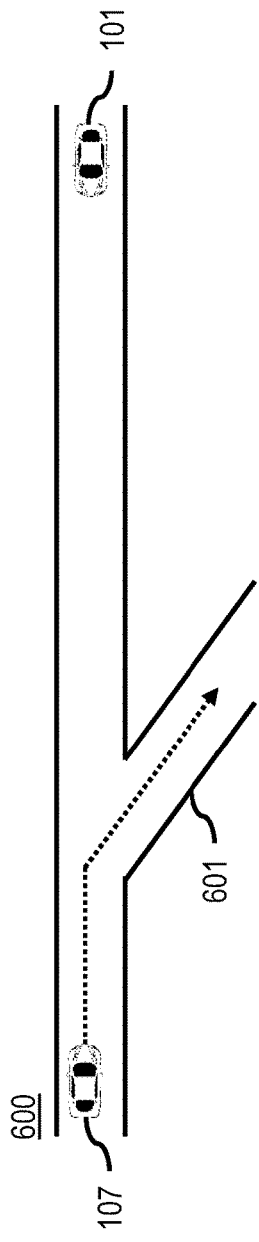
FIGS. 6A-6J are diagrams illustrating an example WWD reaction strategies, according to one embodiment.

FIG. 6A illustrates an example 600 of the strategy of step 505. In this example 600, the autonomous vehicle 107 is facing the oncoming vehicle 101 that is driving the wrong way towards the autonomous vehicle 107. Based on the decision tree 500 determining that the one or more attributes of the map 117 indicate that an exit path 601 is available, the strategy module 205 selects the strategy (e.g., the selected WWD reaction strategy 119) that comprises moving the autonomous vehicle 107 to take the exit path 601.

If at decision step 503, the decision tree 500 determines that no exit path is available, the process moves to decision step 507. Decision step 507 determines whether the attributes of the map 117 indicate that there is space for the autonomous vehicle 107 to move to another lane. If there is space, then the selected WWD reaction strategy 119 is to move to another lane with space (step 509). In one embodiment, the strategy of step 509 includes options based on whether the attributes of the map 117 indicate that the road on which the autonomous vehicle 107 is traveling is a two-lane road or a road with more three or more lanes.

Figure 6B:
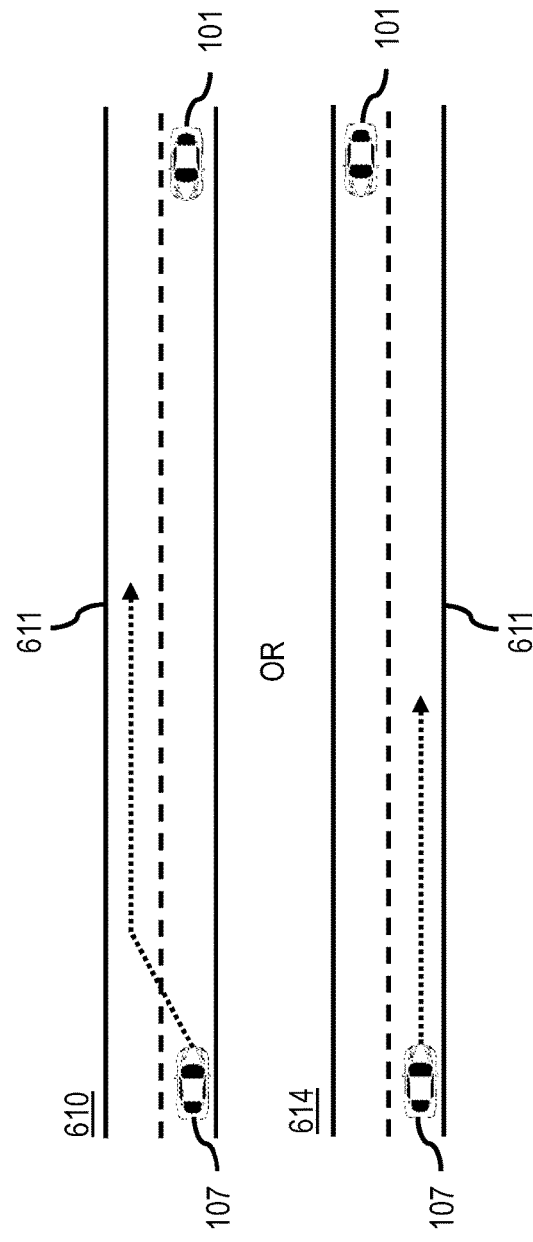

FIG. 6B illustrates the scenario of the strategy of step 509 in which the attributes of the map 117 indicates that the road is a two-lane road. In example 610 of FIG. 6B, based on the decision tree 500 determining that the one or more attributes of the map 117 indicate that a road 611 on which the autonomous vehicle 107 and the oncoming vehicle 101 are driving is a two-lane road and based on determining that the oncoming vehicle 101 is in a same lane as the autonomous vehicle 107, then the selected WWD reaction strategy 119 comprises performing at least one of: (1) putting on a hazard light of the autonomous vehicle 107; (2) slowing down a speed of the autonomous vehicle 107 by at least a specified percentage (e.g., 30%); (3) moving the autonomous vehicle 107 to a next lane (e.g., from the right lane to the left lane in this example); (4) flashing headlights of the autonomous vehicle 107 (e.g., to notify the driver of the oncoming vehicle 101); (5) actuating a horn of the autonomous vehicle 107 when the oncoming vehicle 101 approaches with a proximity threshold; or (6) communicating a risk of the oncoming vehicle 101 over a communication channel (e.g., a communication using v2v, v2x, etc.).

Alternatively, in example 614 of FIG. 6B, based on the decision tree 500 determining that the one or more attributes of the map 117 indicate that a road 611 on which the autonomous vehicle 107 and the oncoming vehicle 101 are driving is a two-lane road and based on determining that the oncoming vehicle 101 is in a different lane than the autonomous vehicle 107, then the selected WWD reaction strategy 119 comprises performing at least one of: (1) putting on the hazard light of the autonomous vehicle 107; (2) slowing down the speed of the autonomous vehicle 107 by at least the specified percentage (e.g., 30%); and (3) flashing headlights of the autonomous vehicle 107 (e.g., to notify the driver of the oncoming vehicle 101).

Figure 6C:
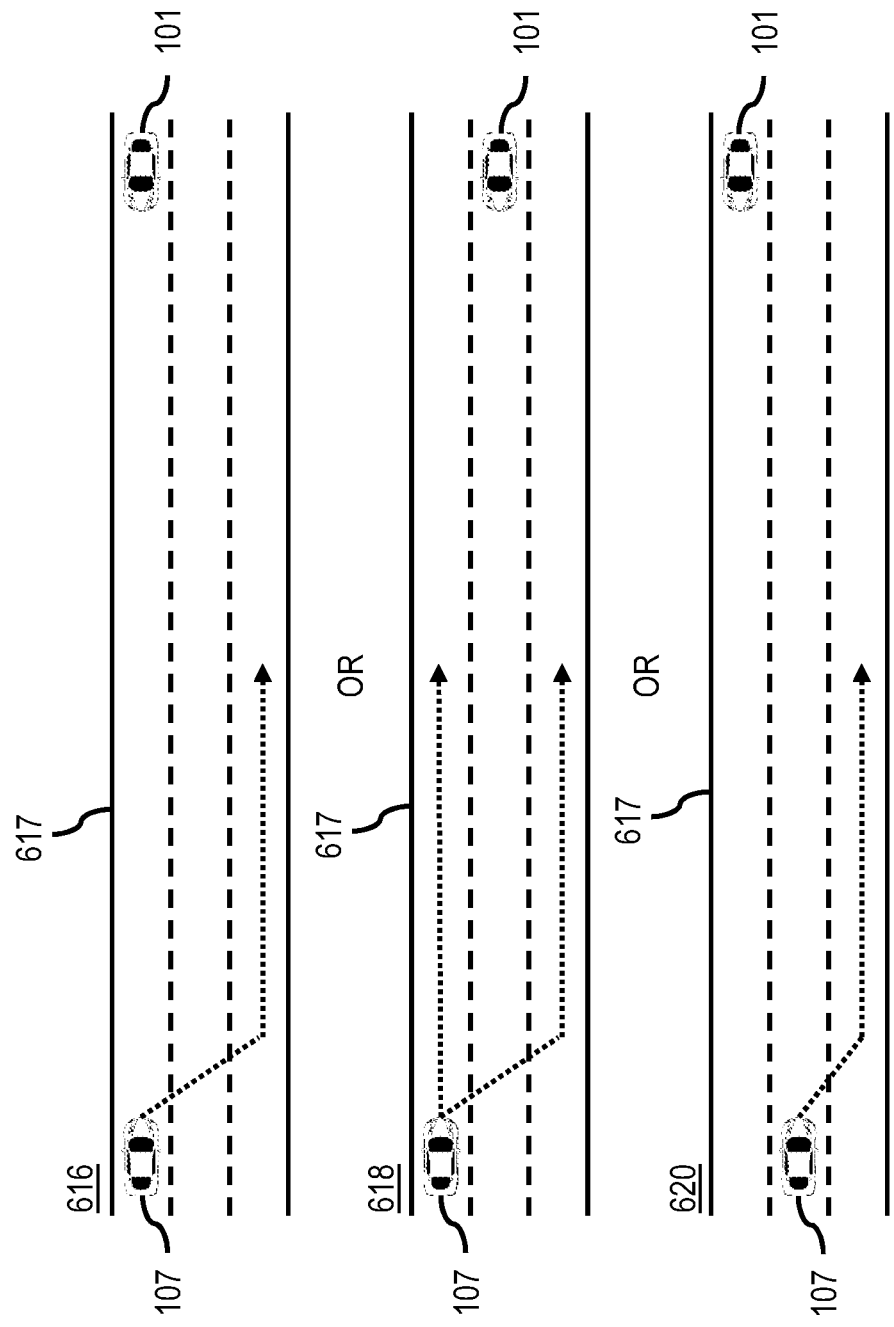

FIG. 6C illustrates the scenario of the strategy of step 509 in which the attributes of the map 117 indicates that the road has three or more lanes. Under this scenario, the strategy is to move the autonomous to the farthest lane from the oncoming vehicle 101. Accordingly, based on determining that the oncoming vehicle 101 is in a same lane or a different lane as the autonomous vehicle 107, then the selected WWD reaction strategy 119 comprises performing at least one of performing at least one of: (1) putting on the hazard light of the autonomous vehicle 107; (2) slowing down the speed of the autonomous vehicle 107 by at least the specified percentage (e.g., 30%); and (3) moving the autonomous vehicle to a farthest lane from a current lane. Examples of this strategy is illustrated in FIG. 6C. For example, in example 616 of FIG. 6C, the road 617 has three lanes with both the autonomous vehicle 107 and oncoming vehicle 101 driving in the left lane. The autonomous vehicle 107 can then move to right lane to be in the farthest lane from the oncoming vehicle 101.

If the oncoming vehicle 101 is in a different lane of the road 617, then the selected WWD reaction strategy 119 involves the autonomous vehicle 107 checking the attributes of the map 117 if there is any lane that is farthest from the hazard lane (e.g. the lane in which the oncoming vehicle 101 is driving). By way of example, this can be detected using a lane detection algorithm as part of the dynamic map creation process. In example 618 of FIG. 6C, the road 617 has three lanes with the autonomous vehicle 107 in the left lane and the oncoming vehicle 101 in the middle lane. In this scenario, the autonomous vehicle 107 can stay in the left lane or move to the right lane to be in the farthest lane from the oncoming vehicle 101. Finally, in example 620 of FIG. 6C, the road 617 has three lanes with the autonomous vehicle 107 in the middle lane and the oncoming vehicle 101 in the left lane. The autonomous vehicle 107 can then move from the middle lane to the right lane which is farthest from the left lane in which the oncoming vehicle 101 is driving.

Figure 6D:
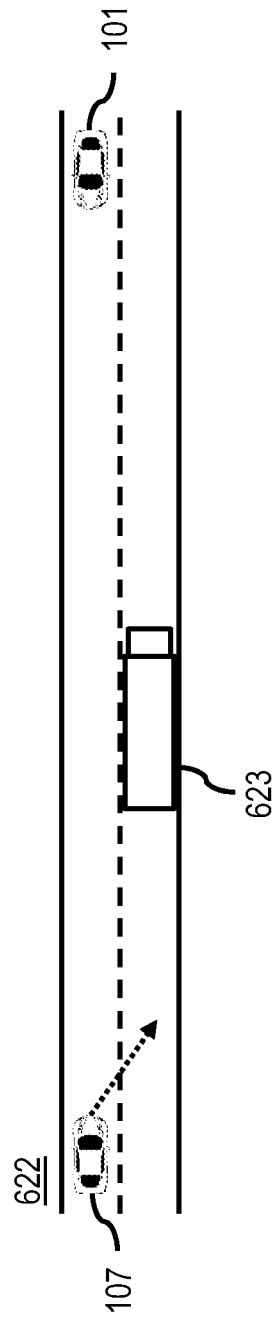

FIG. 6D illustrates the scenario 622 of the strategy of step 509 in which the attributes of the map 117 indicates that the road has at least two lanes. In this scenario 622, based on the decision tree 500 determining that the one or more attributes of the map 117 indicate that a bigger vehicle 623 is within a proximity threshold (e.g., in a next lane or same lane) of the autonomous vehicle 107, the strategy module 205 selects the strategy that comprises moving the autonomous vehicle 107 to behind the bigger vehicle 623 to avoid the oncoming vehicle 101. In other words, as shown in FIG. 6D, if the autonomous vehicle 107 detects a heavy or bigger vehicle 621 (e.g., trucks, etc.) in another lane or the same lane as the autonomous vehicle 107, the autonomous vehicle 107 can hide behind the bigger vehicle 621 (e.g., at a safe distance to minimize or avoid damage should the oncoming vehicle 101 collide with the bigger vehicle 621) to avoid line of sight with the driver of the oncoming vehicle 101 and thus collision.

Figure 6E:
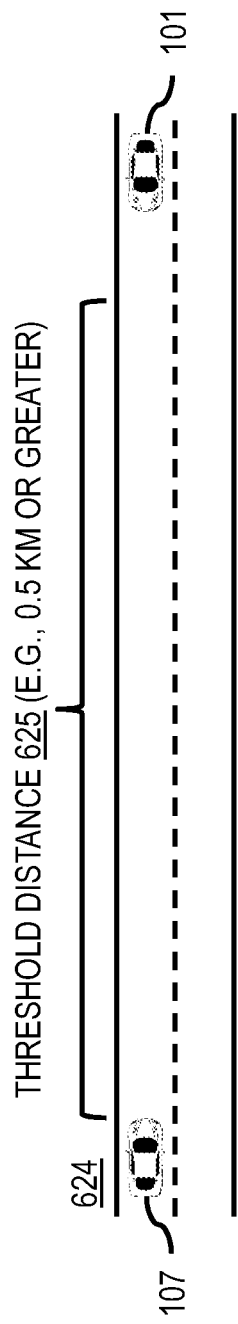

If at decision step 507, the decision tree 500 determines that there is no space for the autonomous vehicle 107 in another lane, the process proceeds to decision step 511. Decision step 511 evaluates the attributes of the map 117 to determine whether there is enough space for the autonomous vehicle 211 to slow its speed or to reverse direction to allow more time more to make a WWD reaction decision. In step 513, as show in example 624 of FIG. 6E, based on determining that there is enough room to slow and/or that the one or more attributes of the map 117 indicate that the oncoming vehicle 101 is more than a threshold distance 625 (e.g., 0.5 km or greater) away from the autonomous vehicle 107, the strategy module 205 selects the strategy that comprises slowing down a speed of the autonomous vehicle by at least a specified percentage (e.g., to allow more time to make a WWD reaction decision) and then selecting at least one other strategy from the plurality of candidate strategies (e.g., candidate WWD reaction strategies 121).

Figure 6F:
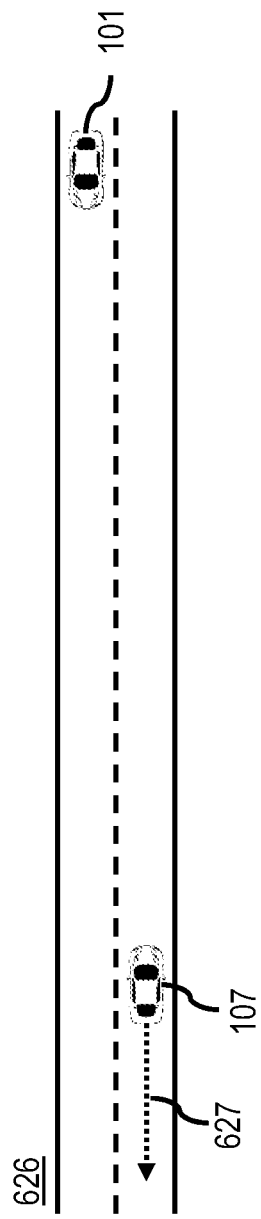

Alternatively, as shown in example 626 of FIG. 6F, based on the decision tree 500 determining that the autonomous vehicle 107 supports bidirectional driving and that the one or more attributes of the map 117 indicate a reverse path 627 is available (e.g., enough room is available to reverse drive), the strategy module 205 selects the strategy that comprises reverse driving the autonomous vehicle 107 on the reverse path 627 to avoid the oncoming vehicle. In other words, if the autonomous vehicle 107 has the feature to drive in both directions with the same speed, then backward or reverse driving can be used as a temporary measure (e.g., based on the map 117) until the autonomous vehicle 107 finds another scenario (e.g., an exit path) to avert the risk. In one embodiment, such reverse driving could be started as soon as the autonomous vehicle 107 gets information about the detection of the oncoming vehicle 101 (e.g., the WWD threat) through v2v, v2x, and/or any other equivalent method.

If at decision step 511, the decision tree 500 determines that there is not enough room to slow or reverse, then the process proceeds to decision step 515. Decision step 515 determines whether there is enough room on the edge of the road for the autonomous vehicle 107 to drive. For example, in step 517, if there is enough space for the autonomous vehicle 107 to fit on the edge of the road, the autonomous vehicle 107 can move off the road and place itself on the edge of the road (e.g., on the shoulder, or even off road next to the road depending on the road configuration).

Figure 6G:
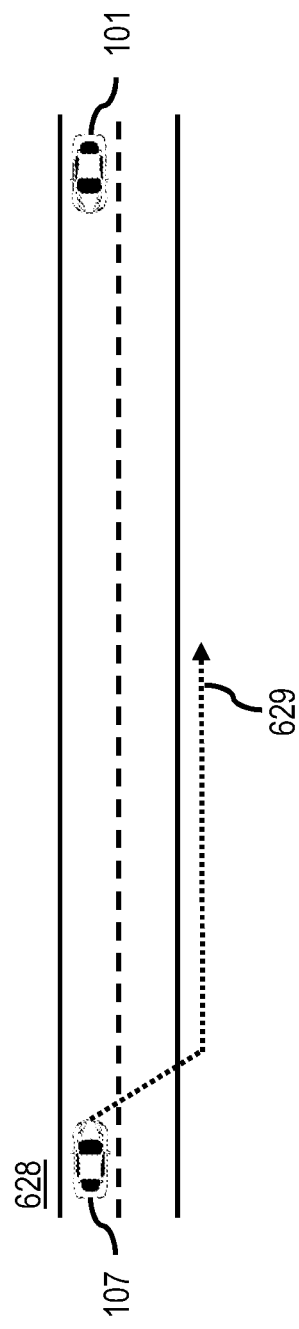

FIG. 6G illustrates an example scenario 628 in which the autonomous vehicle 107 has move to the edge 629 of the road (e.g., off road to the right of the right lane). More specifically, based on the decision tree 500 determining that the one or more attributes of the map 117 indicate that an edge 629 of a road on which the autonomous vehicle is driving has space to fit the autonomous vehicle 107, the strategy module 205 selects the strategy that comprises moving the autonomous vehicle 107 to the edge 629 to road to avoid the oncoming vehicle 101.

If at decision step 515, the decision tree 500 determines that the there is no space of the edge of the road to fit the autonomous vehicle, the process proceeds to decision step 519. Decision step 519 determines whether the one or more attributes of the map 117 indicate that there are other nearby autonomous vehicles within a proximity threshold of the autonomous vehicle 107. For example, there may be several autonomous vehicles on the road. In such a case where previous strategies are not available based on the decision tree 500, the autonomous vehicle 107 can look for other autonomous vehicles which are empty and communicate with them for help (step 521). The other empty autonomous vehicle (e.g., without any passengers) will collide with the oncoming vehicle 101 (e.g., the WWD threat) to disable the oncoming vehicle 101 to minimize potential risks if other reaction strategies to this point is not available.

Figure 6H:
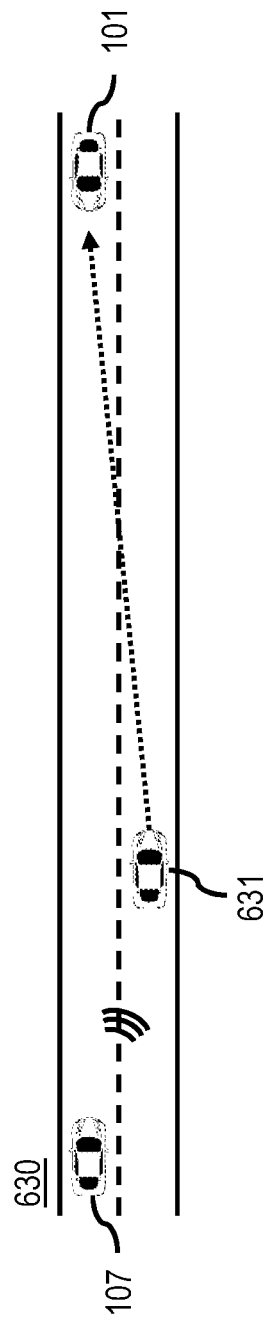

FIG. 6H illustrates an example scenario 630 in which the autonomous vehicle 107 communicates with another autonomous vehicle 631 that is empty of passengers for help. More specifically, based on the decision tree 500 determining that the one or more attributes of the map 117 indicate that other autonomous vehicle with no passengers is within a proximity threshold of the autonomous vehicle, the strategy module 205 selects the strategy that comprises communicating (e.g., via v2v, v3x, or other communication method) with the other autonomous vehicle 631 to collide with the oncoming vehicle 101. In one embodiment, during the mapping step, the autonomous vehicle 107 can query any detected autonomous vehicle for their passenger carrying status. The locations and speeds of the autonomous vehicles that respond or are otherwise detected to be carrying no passengers can be included as attributes of the map 117 for use in processing the decision tree 500.

If at decision step 519, the decision tree 500 determines that there are no nearby empty autonomous vehicles, the process proceeds to decision step 523. Decision step 523 determines whether the one or more attributes of the map 117 indicate that there is a less damaging object or road element nearby the autonomous vehicle 107. In other words, if the decision tree 500 has not resulted in selecting a WWD reaction strategy up to this point, the autonomous vehicle 107 can decide to hit another road element or object known to be less damaging than hitting another front facing vehicle (e.g., head-on collision with the oncoming vehicle 101) (step 525).

Figure 6I:
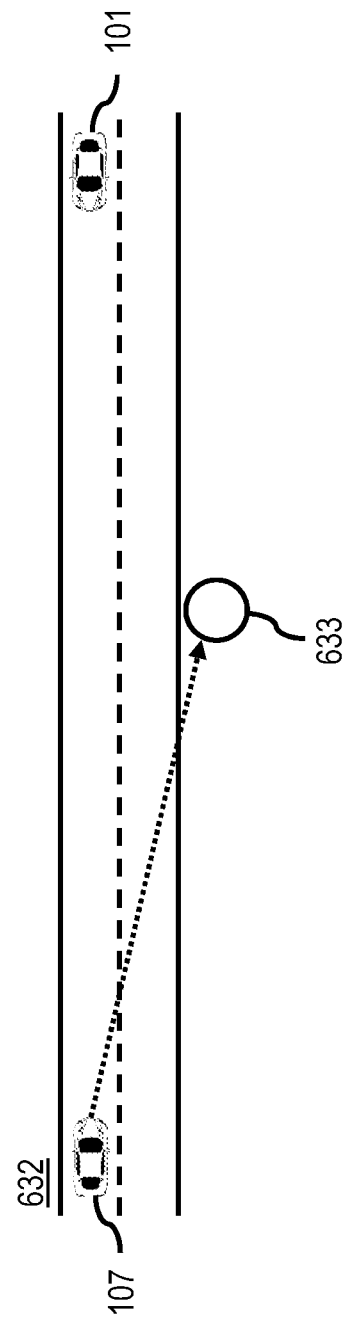

FIG. 6I illustrates an example scenario 632 in which the autonomous vehicle 107 decides or is configured to collide with a less damaging road element 633 (e.g., road sign, bush, collision barrels, etc.) instead of the oncoming vehicle 101. More specifically, based on the decision tree 500 determining that the one or more attributes of the map 117 indicate that a road element 634 with less collision damage potential than a potential collision with the oncoming vehicle 101 is available, the strategy module 205 selects the strategy that comprises configuring the autonomous vehicle 107 to collide with the road element 633 before the potential collision with the oncoming vehicle 101. In one embodiment, the strategy module 205 can have access to a database of road elements and/or objects and their known collision damage potential. The strategy module 205 can then select the least damage causing road element or object that has been detected and mapped in the map 117, and then initiate a collision with that selected object.

Figure 6J:
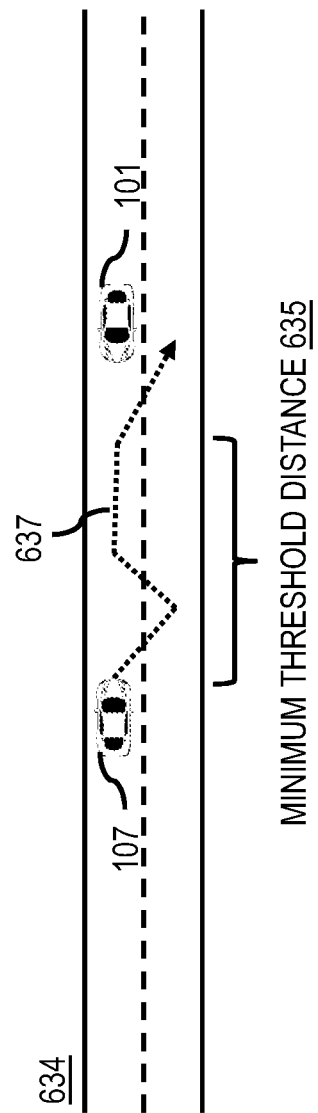

If at decision step 523, there are no other less damaging object or road element, the decision tree proceeds to the final strategy at step 527 of last second maneuver avoidance based on sensors detection. As shown in example 634 of FIG. 6J, in one embodiment, the WWD reaction strategy of step 527 can be initiated with no other strategy in the decision tree 500 is available (e.g., based on attributes of the map 117) and the autonomous vehicle 107 and oncoming vehicle 101 are within a minimum threshold distance 635. This strategy involves relying on the onboard vehicle driving intelligence and built-in collision avoidance systems of the autonomous vehicle 107 to automatically determine the best maneuver or sequence of maneuvers 637 to avoid or otherwise minimize the collision with the oncoming vehicle 101. In other words, the autonomous driving systems of the autonomous vehicle 107 may be faster and more efficient to determine what best maneuver to perform at high speed (or at close distances within the minimum threshold distance 635) without manual intervention based, for instance, on vehicle sensor data and trajectory analysis.

It is noted that the example decision tree 500 described above is provided by way illustration and not as limitations. It is contemplated that the decision hierarchy can be changed and/or additional WWD reaction strategies can be added as they are developed.

After processing through the decision tree 500 according to embodiments of step 303 of process 300, the process continues to step 305. In step 305, the output module can present or otherwise surface the selected WWD reaction strategy 119 (e.g., as determined by the decision tree 500) in a user interface of the autonomous vehicle 107 or any other device associated with the autonomous vehicle (e.g., a connected mobile device or other user equipment (UE) device).

Figure 7:
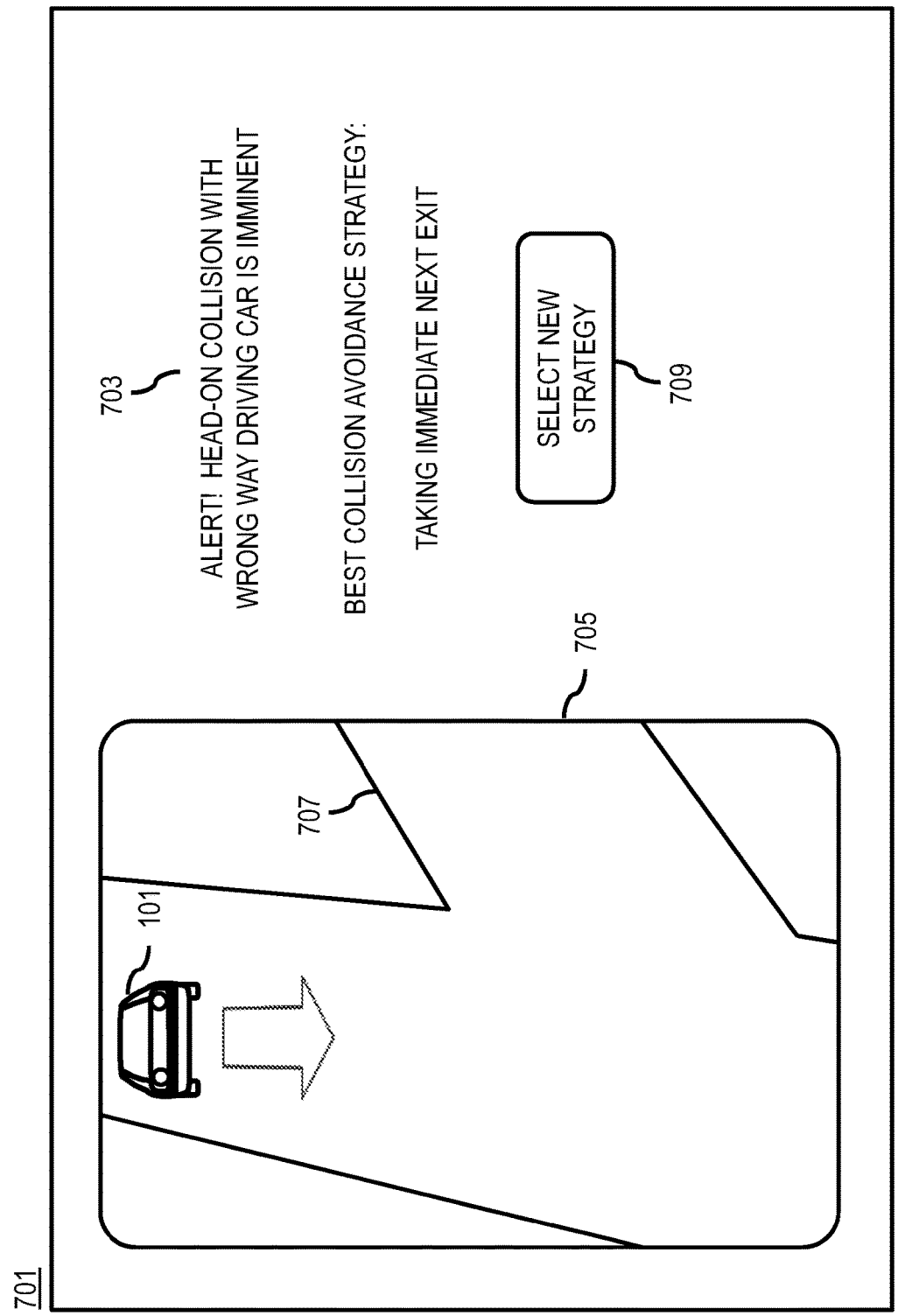
FIG. 7 is a diagram of an example user interface for presenting a selected WWD reaction strategy for an autonomous vehicle, according to one embodiment.

FIG. 7 is a diagram of an example user interface 701 for presenting a selected WWD reaction strategy 119 for an autonomous vehicle 107, according to one embodiment. In the example of FIG. 7, the system 100 has detected an oncoming vehicle 101 that is traveling in the wrong direction on a unidirectional road towards the autonomous vehicle 107. The system 100 detects the lane that the oncoming vehicle 101 is traveling and the lane that the autonomous vehicle 107 is traveling. The system 100 has also developed a map 117 of the surrounding area based on the autonomous vehicle 107's sensor data and map data of the geographic database 113. By using the attributes of the map 117 in the decision tree 500, the system 100 determines that the first strategy in the decision tree 500 (e.g., taking an exit from the highway or road if available to avoid the oncoming WWD vehicle 101) is available and selects the strategy for presentation. Accordingly, user interface 701 presents a user interface element 703 displaying an alert message, "Alert! Head-on collision with wrong way driving car is imminent," and the selected WWD reaction strategy 119, "Best collision avoidance strategy: Taking immediate next exit." In one embodiment, the user interface 701 also presents a user interface element 705 presenting a visual representation of the map 117 that depicts the oncoming WWD vehicle 101 and the recommended next exit 707. In addition, the user interface 701 can provide user interface element 709 to "Select a new strategy." If the user selects the user interface element 709, the system 100 can then select and present the next available WWD reaction strategy available in the decision tree 500 based on the attributes of the map 117.

Returning to step 307 of process 300, in addition to or in place of presenting the selected WWD reaction strategy 119 in a user interface, the output module 207 can interact with a vehicle control interface 209 to send instructions to the autonomous vehicle 107 to execute instructions to perform the actions specified in the selected WWD reaction strategy 119. For example, if the selected WWD reaction strategy 119 is to take the next exit, the instructions provided to the vehicle control interface 209 can instruct the autonomous vehicle 107 to maneuver to the exit and turn onto the off ramp from the current road. The instructions can be provided using any instruction set compatible with the autonomous driving systems of the autonomous vehicle 107.

It is contemplated that the autonomous vehicle 107 can support any number of autonomous driving modes. The vehicle, for instance, can be an autonomous vehicle or highly assisted driving vehicle that is capable of sensing its environment and navigating within a road network without driver or passenger input. It is noted that autonomous vehicles and highly assisted driving vehicles are part of a spectrum of vehicle classifications that can span from no automation to fully autonomous operation. For example, the Society of Automotive Engineers (SAE) defines six levels of driving automation from 0 to 5 as shown below.

Level 0: Automated system issues warnings and may momentarily intervene but has no sustained vehicle control.

Level 1 ("hands on"): The driver and the automated system share control of the vehicle. Examples are Adaptive Cruise Control (ACC), where the driver controls steering and the automated system controls speed; and Parking Assistance, where steering is automated while speed is manual. The driver must be ready to retake full control at any time. Lane Keeping Assistance (LKA) Type II is a further example of level 1 self-driving.

Level 2 ("hands off"): The automated system takes full control of the vehicle (accelerating, braking, and steering). The driver must monitor the driving and be prepared to intervene immediately at any time if the automated system fails to respond properly. The shorthand "hands off" is not meant to be taken literally. In fact, contact between hand and wheel is often mandatory during SAE 2 driving, to confirm that the driver is ready to intervene.

Level 3 ("eyes off"): The driver can safely turn their attention away from the driving tasks, e.g., the driver can text or watch a movie. The vehicle will handle situations that call for an immediate response, like emergency braking. The driver must still be prepared to intervene within some limited time, specified by the manufacturer, when called upon by the vehicle to do so. For example, when activated by the human driver, the car takes full control of all aspects of driving in slow-moving traffic at up to 60 kilometers per hour. The function works only on highways with a physical barrier separating one stream of traffic from oncoming traffic.

Level 4 ("mind off"): As level 3, but no driver attention is ever required for safety, i.e., the driver may safely go to sleep or leave the driver's seat. Self-driving is supported only in limited spatial areas (geofenced) or under special circumstances, like traffic jams. Outside of these areas or circumstances, the vehicle must be able to safely abort the trip, i.e., park the car, if the driver does not retake control.

Level 5 ("steering wheel optional"): No human intervention is required. An example would be a robotic taxi.

The various embodiments described herein are applicable to vehicles that are classified in any of the levels of automation (levels 0-5) discussed above. For example, in the case of autonomous modes of operation, the vehicle can automatically react to the detection of WWD threats and/or selection of a WWD reaction strategy. Even in the case of completely manual driving (e.g., level 0), the vehicle can present an alert or notification when traveling on road links with WWD threats to provide greater situational awareness and improve safety for drivers.

Returning to FIG. 1, in one embodiment, the vehicle control module 109 and mapping platform 115 have connectivity over a communication network 118 to the services platform 123 that provides one or more services 125 (e.g., mapping data and/or sensor data collection services). By way of example, the services 125 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 123 uses the output (e.g., selected WWD strategy 119) of the vehicle control module 109 and/or mapping platform 115 to provide services such as autonomous driving, navigation, mapping, other location-based services, etc.

In one embodiment, the mapping platform 115 may be a platform with multiple interconnected components. The mapping platform 115 may include multiple servers, intelligent networking devices, computing devices, components and corresponding software for providing parametric representations of lane lines. In addition, it is noted that the mapping platform 115 may be a separate entity of the system 100, a part of the one or more services 125, a part of the services platform 123, or included within the autonomous vehicle 107 (e.g., vehicle control module 109).

In one embodiment, content providers 127 may provide content or data (e.g., including geographic data, parametric representations of mapped features, etc.) to the geographic database 113, the mapping platform 115, the services platform 123, the services 125, and the autonomous vehicle 107. The content provided may be any type of content, such as map content, textual content, audio content, video content, image content, etc. In one embodiment, the content providers 127 may provide content that may aid in the detecting and classifying of WWD events or other related characteristics (e.g., characteristics of the oncoming vehicle 101). In one embodiment, the content providers 127 may also store content associated with the geographic database 113, mapping platform 115, services platform 123, services 125, and/or autonomous vehicle 107. In another embodiment, the content providers 127 may manage access to a central repository of data, and offer a consistent, standard interface to data, such as a repository of the geographic database 113.

By way of example, the vehicle control module 109 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicle control module 109 can support any type of interface to the user (such as "wearable" circuitry, etc.). In one embodiment, the vehicle control module 109 may be associated with the autonomous vehicle 107 or be a component part of the autonomous vehicle 107.

In one embodiment, the autonomous vehicle 107 is configured with various sensors for generating or collecting sensor data, vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for detecting physical dividers according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the autonomous vehicle 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the autonomous vehicle 107 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the autonomous vehicle 107 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 118 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicle control module 109, mapping platform 115, services platform 123, services 125, autonomous vehicle 107, and/or content providers 127 communicate with each other and other components of the system 100 using well known, new or still developing protocols. In this context, a protocol includes a set of rules defining how the network nodes within the communication network 118 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
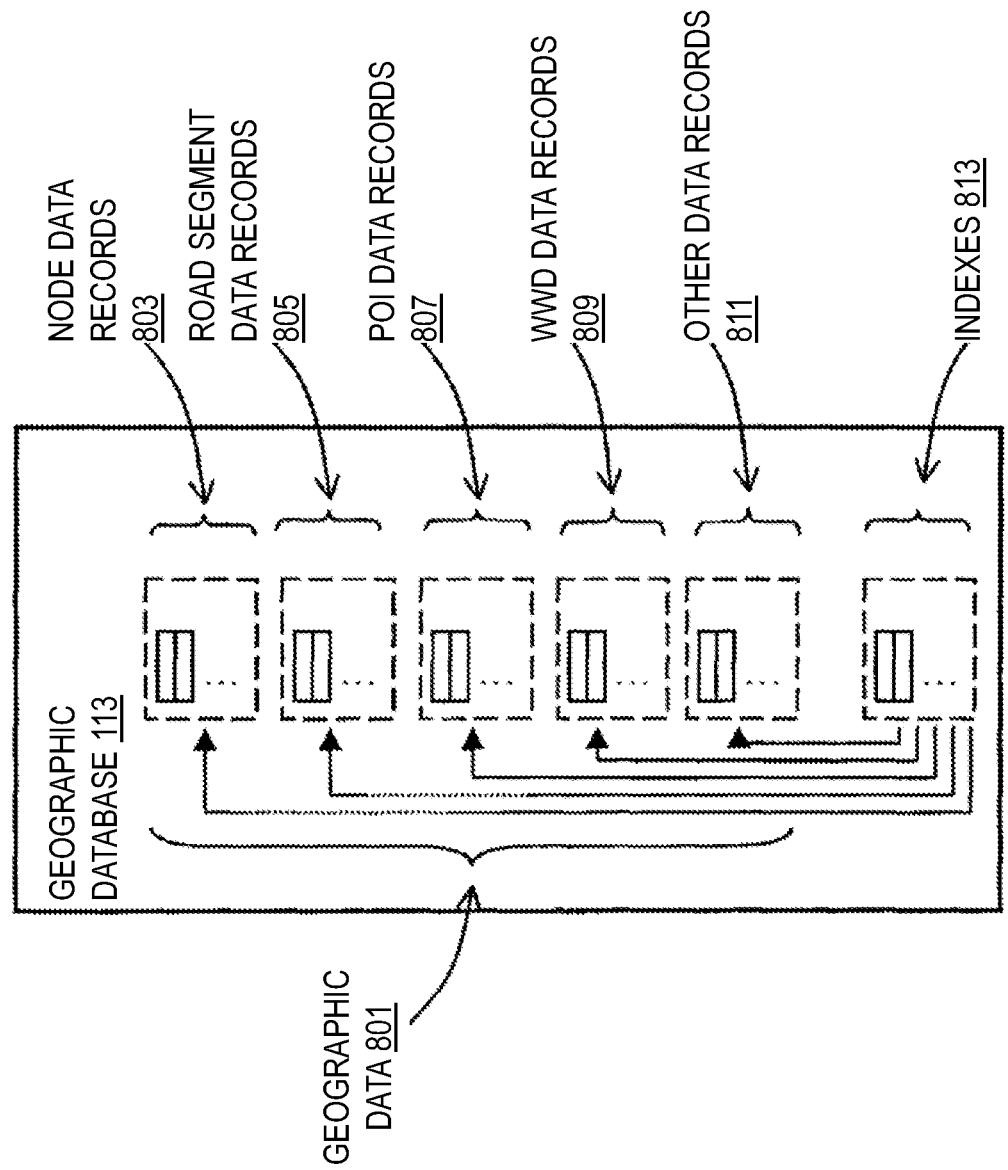
FIG. 8 is a diagram of a geographic database, according to one embodiment.

FIG. 8 is a diagram of a geographic database, according to one embodiment. In one embodiment, the geographic database 113 includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 803, road segment or link data records 805, POI data records 807, WWD records 809, other records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 113. In one embodiment, the indexes 813 may be used to quickly locate data without having to search every row in the geographic database 113 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 113 can also include WWD records 809 for WWD reaction strategies 121, selected WWD reaction strategies 119, developed maps 117, related sensor data, decision trees, evaluation results of decision trees, and/or other related road characteristics. In one embodiment, the WWD records 809 can be associated with segments of a road link (as opposed to an entire link). It is noted that the segmentation of the road for the purposes of determining WWD reaction strategies for autonomous vehicles 107 can be different than the road link structure of the geographic database 113. In other words, the segments can further subdivide the links of the geographic database 113 into smaller segments (e.g., of uniform lengths such as 5-meters). In this way, WWD reaction strategies can be selected at a level of granularity that is independent of the granularity or at which the actual road or road network is represented in the geographic database 113. In one embodiment, the WWD data records 809 can be associated with one or more of the node records 803, road segment records 805, and/or POI data records 807; or portions thereof (e.g., smaller or different segments than indicated in the road segment records 805, individual lanes of the road segments, etc.) to provide situational awareness to drivers and provide for safer autonomous operation and routing of vehicles. In this way, the WWD data records 809 can also be associated with the characteristics or metadata of the corresponding records 803, 805, and/or 807.

In one embodiment, the geographic database 113 can be maintained by the content provider 127 in association with the services platform 123 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., WWD events, WWD patterns, etc.) and/or record information about them, for example. Also, remote sensing, such as aerial or satellite photography, can be used.

In one embodiment, the geographic database 113 include high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 113 is stored as a hierarchical or multi-level tile-based projection or structure. More specifically, in one embodiment, the geographic database 113 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the autonomous vehicle 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining a WWD reaction strategy for an autonomous vehicle 107 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
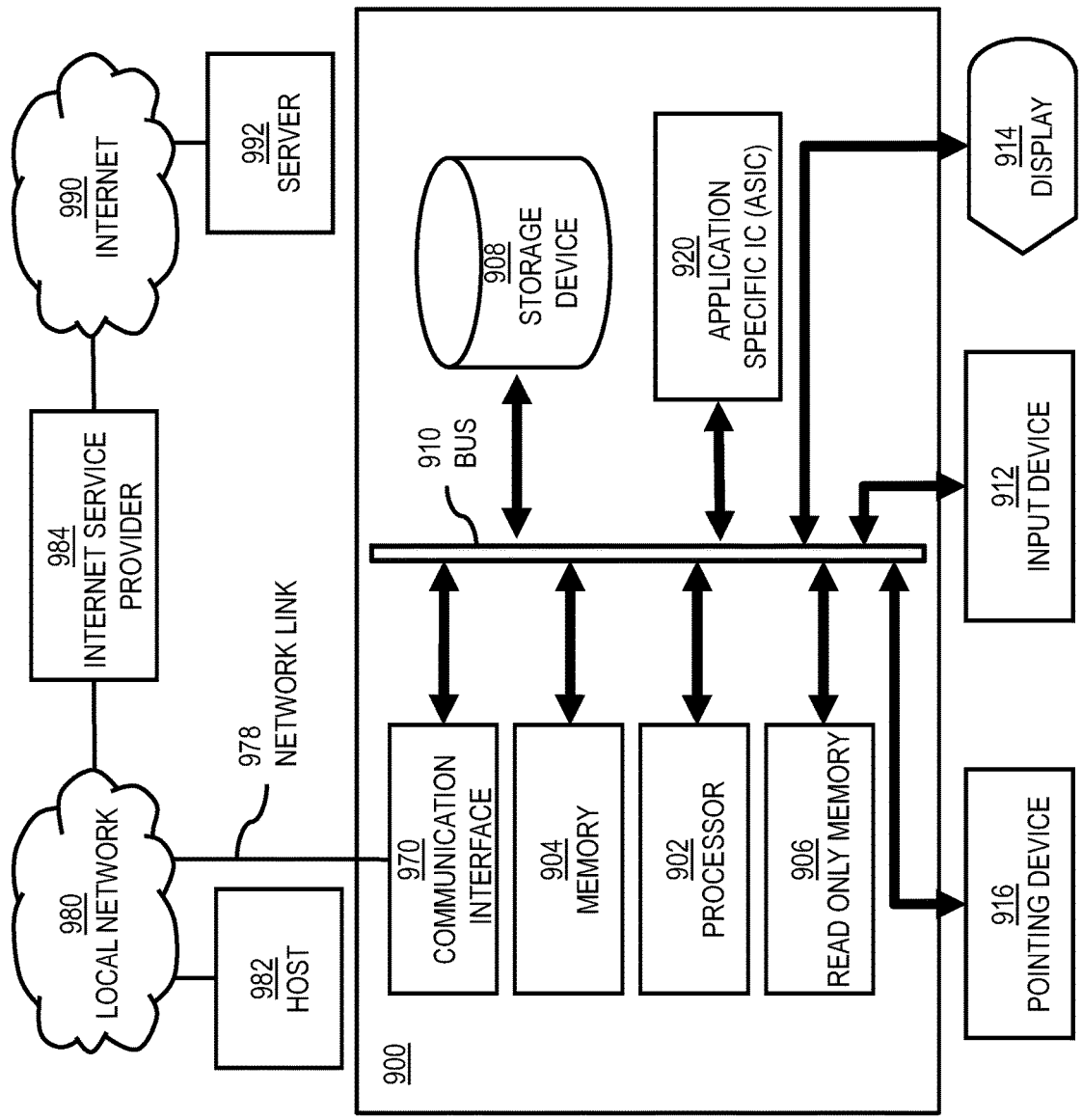
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to determine a WWD reaction strategy for an autonomous vehicle 107 as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to determine a WWD reaction strategy for an autonomous vehicle 107. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for determining a WWD reaction strategy for an autonomous vehicle 107. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining a WWD reaction strategy for an autonomous vehicle 107, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 118 for determining a WWD reaction strategy for an autonomous vehicle 107.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to determine a WWD reaction strategy for an autonomous vehicle 107 as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine a WWD reaction strategy for an autonomous vehicle 107. The memory 1005 also stores the data associated with or generated by the execution of the inventive steps.

Figure 11:
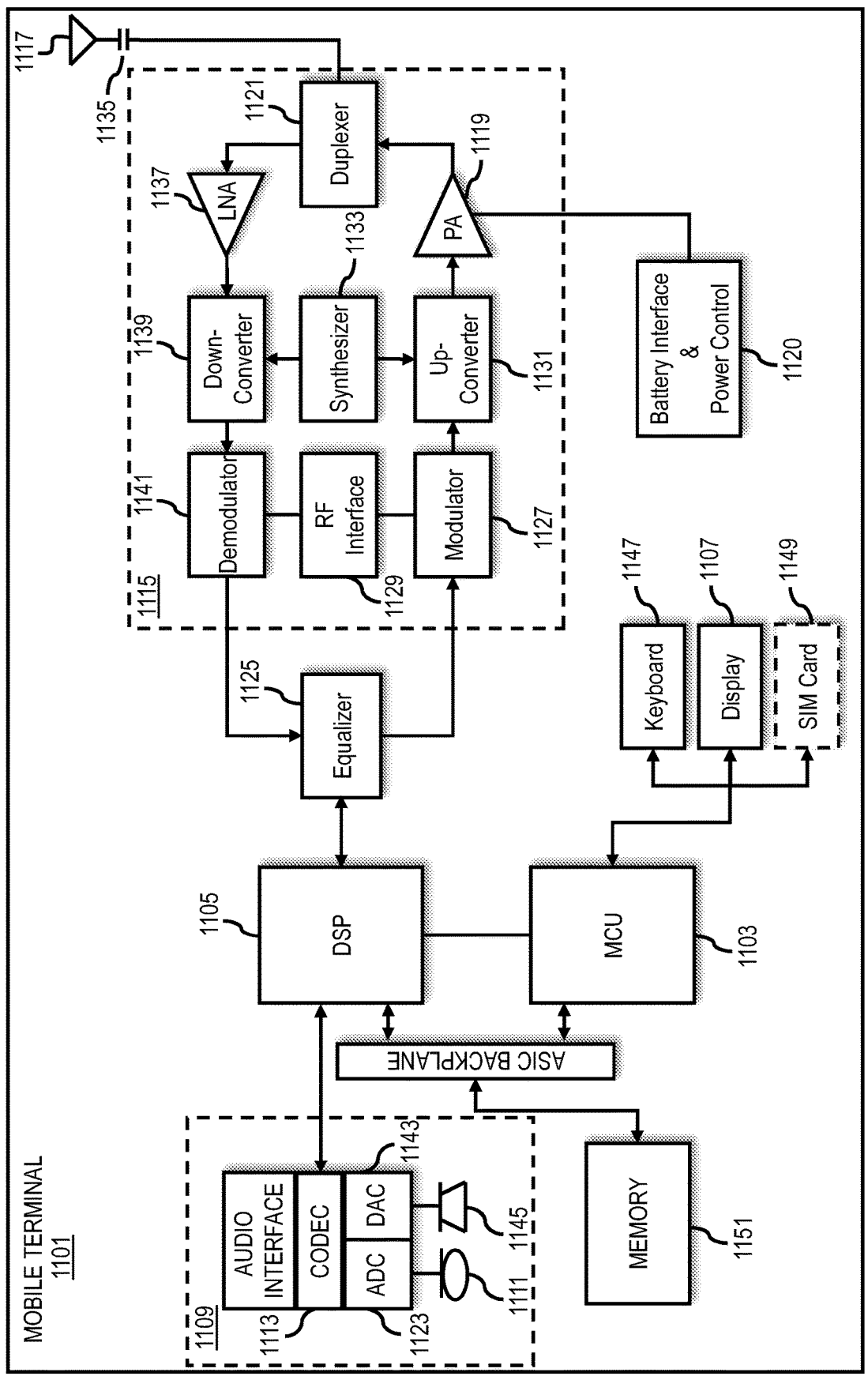
FIG. 11 is a diagram of a mobile terminal (e.g., handset or vehicle or part thereof) that can be used to implement an embodiment.

FIG. 11 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to determine a WWD reaction strategy for an autonomous vehicle 107. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing mapping data, sensor data, or a combination thereof to develop a map of an area within a threshold distance of an autonomous vehicle in response to a detection of an oncoming vehicle that is driving in a wrong direction towards the autonomous vehicle;
   using a decision tree of a plurality of candidate strategies for avoiding the oncoming vehicle to select a strategy based on one or more attributes of the map;
   based on the decision tree determining that the one or more attributes of the map indicate that an edge of a road on which the autonomous vehicle is driving has space to fit the autonomous vehicle, selecting the strategy that comprises moving the autonomous vehicle to the edge of the road to avoid the oncoming vehicle;
   presenting the selected strategy in a user interface of the autonomous vehicle; and
   configuring the autonomous vehicle to operate using the selected strategy.

2. The method of claim 1, wherein the one or more attributes of the map indicates at least one of:
   a first lane in which the autonomous vehicle is driving;
   a second lane in which the oncoming vehicle is approaching in the wrong direction;
   a number of lanes of a road on which the autonomous vehicle, the oncoming vehicle, or a combination thereof is driving;
   a road width of the road;
   a distance to one or more other vehicles;
   a speed of the one or more other vehicles;
   a number of one or more other autonomous vehicles;
   whether the one or more other autonomous vehicles are carrying at least one passenger; and
   an alternate route for the autonomous vehicle.

3. An apparatus comprising:
   at least one processor; and
   at least one memory including computer program code for one or more programs,
   the at least one memory and the computer program code configured to, with the at least one processor, cause the apparatus to perform at least the following,
      in response to a detection of an oncoming vehicle that is driving in a wrong direction towards an autonomous vehicle, process mapping data, sensor data, or a combination thereof to develop a map of an area within a threshold distance of the autonomous vehicle;
      use a decision tree of a plurality of candidate strategies for avoiding the oncoming vehicle to select a strategy based on one or more attributes of the map;
      based on the decision tree determining that the one or more attributes of the map indicate that an edge of a road on which the autonomous vehicle is driving has space to fit the autonomous vehicle, selecting the strategy that comprises moving the autonomous vehicle to the edge of the road to avoid the oncoming vehicle;
      present the selected strategy in a user interface of the autonomous vehicle; and
      configure the autonomous vehicle to operate using the selected strategy.

4. The apparatus of claim 3, wherein the one or more attributes of the map indicates at least one of:
   a first lane in which the autonomous vehicle is driving;
   a second lane in which the oncoming vehicle is approaching in the wrong direction;
   a number of lanes of a road on which the autonomous vehicle, the oncoming vehicle, or a combination thereof is driving;
   a road width of the road;
   a distance to one or more other vehicles;
   a speed of the one or more other vehicles;
   a number of one or more other autonomous vehicles;
   whether the one or more other autonomous vehicles are carrying at least one passenger; and
   an alternate route for the autonomous vehicle.

5. A non-transitory computer-readable storage medium carrying one or more sequences of one or more instructions which, when executed by one or more processors, cause an apparatus to perform:
   in response to a detection of an oncoming vehicle that is driving in a wrong direction towards an autonomous vehicle, processing mapping data, sensor data, or a combination thereof to develop a map of an area within a threshold distance of the autonomous vehicle;
   using a decision tree of a plurality of candidate strategies for avoiding the oncoming vehicle to select a strategy based on one or more attributes of the map;
   based on the decision tree determining that the one or more attributes of the map indicate that an edge of a road on which the autonomous vehicle is driving has space to fit the autonomous vehicle, selecting the strategy that comprises moving the autonomous vehicle to the edge of the road to avoid the oncoming vehicle;
   presenting the selected strategy in a user interface of the autonomous vehicle; and
   configuring the autonomous vehicle to operate using the selected strategy.

6. The non-transitory computer-readable storage medium of claim 5, wherein the one or more attributes of the map indicates at least one of:

a first lane in which the autonomous vehicle is driving;
a second lane in which the oncoming vehicle is approaching in the wrong direction;
a number of lanes of a road on which the autonomous vehicle, the oncoming vehicle, or a combination thereof is driving;
a road width of the road;
a distance to one or more other vehicles;
a speed of the one or more other vehicles;
a number of one or more other autonomous vehicles;
whether the one or more other autonomous vehicles are carrying at least one passenger; and
an alternate route for the autonomous vehicle.

* * * * *